3,419,530
PREPARATION OF MACROMOLECULAR
POLYOXYMETHYLENES
Meindert Tiessens, Geleen, and Hubertus J. Vroomans,
Beek, Netherlands, assignors to Stamicarbon N.V.,
Heerlen, Netherlands
No Drawing. Filed July 30, 1965, Ser. No. 476,142
Claims priority, application Netherlands, Aug. 1, 1964,
6408845
12 Claims. (Cl. 260—67)

ABSTRACT OF THE DISCLOSURE

A process for the preparation of macromolecular polyoxymethylenes by polymerization of monomeric formaldehyde is disclosed, using an inert liquid distributing agent and a metal salt catalyst dissolved in a distributing agent.

---

The present invention relates to a process for preparing macromolecular polyoxymethylenes by polymerization of monomeric formaldehyde in the presence of a metal salt catalyst.

Various methods for the polymerization of formaldehyde have been described in the prior art.

For instance, it has already been proposed to prepare copolymers of formaldehyde with the aid of a Friedel-Crafts acidic halide catalyst (see British patent specification No. 911,960). The catalysts mentioned in this British patent specification are the halides of boron, aluminium, tin, antimony, titanium, mercury, zinc and iron.

It has also been proposed to use catalysts consisting of aluminium compounds having the formula $AlR_1R_2R_3$, in which $R_1$, $R_2$ and $R_3$ represents halogen atoms, hydrogen atoms, or organic radicals, and to employ a ketone as distributing agent. See German Auslegeschrift No. 1,153,903.

In another known method the catalyst used is a stannous compound of an organic acid. See Belgian patent specification No. 616,168, which also states that stannous halides and stannous oxyhalides are less suitable catalysts. It is also known to use a rhodanide or a metal salt of a halogenated peracid (see Belgian patent specification 608,718 and 606,723). Further, it is known that the metal salt used in the preparation of rubbery products by the copolymeriation of formaldehyde with an unsaturated aldehyde, ketone or cyclic ether, may be a halide or a carbonate (see French patent specification No. 1,281,670).

Finally, it is known that the catalyst used may be a mercury compound. See Belgian patent specification No. 612,394. Inorganic mercury compounds mentioned are mercury nitrate and mercury sulphate. However, it appears from the examples of said Belgian patent that, if these inorganic compounds are present in the reaction mixture in the dissolved form, the yield of polymer is low and the inherent viscosity of a solution of the polymer in parachlorophenol is less than unity.

It is an object of the present invention to provide a novel process for preparing polyoxymethylenes suitable for commercial use as plastics. It is another object of the invention to provide a novel process for preparing polyoxymethylenes having an inherent viscosity greater than unity. It is a further object of the invention to provide a process for preparing polyoxymethylenes by polymerization of monomeric formaldehyde which gives a high yield and utilizes a catalyst that is easy to handle.

Still other object, and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, there is provided a process for preparing macromolecular polyoxymethylenes by polymerization of monomeric formaldehyde in an inert liquid distributing agent in the presence of a metal salt catalyst dissolved in the distributing agent. The dissolved metal salt used in the present invention is a carbon and halogen-free salt of an element wherein the halides of said element are Friedel-Crafts catalysts, with the exception of mercury.

Reference may be made to G. A. Olah "Friedel-Crafts And Related Reactions," Part I, pp. 284–290 (Interscience, 1963), for a disclosure of varous known Friedel-Crafts halide catalysts.

Examples of the carbon and halogen-free metal salts which may be used in the process according to the invention are salts of the above-mentioned elements, e.g., boron, aluminium, tin, antimony, titanium, zinc and iron, with anions of inorganic acids containing one of the elements sulfur, nitrogen, phosphorus, antimony, arsenic, titanium, tin, or aluminium, etc., e.g. sulfates, nitrates, phosphates, antimonates, arsenates, titanates, stannates or aluminates. Preferably a nitrate salt is used, for instance cadmium nitrate, zinc nitrate, iron nitrate or cobalt nitrate.

It is an advantage of the process of this invention that the metal salts used as catalysts may contain water of crystallization without adversely affecting the properties of the polyoxymethylenes produced. For instance, cadmium nitrate with 4 molecules of water of crystallization- and iron nitrate with 9 molecules of water of crystallization can be advantageously used in the present invention. Normally, Friedel-Crafts catalysts and reactions require a water-free system.

The catalytic metal salts according to the invention only need be added in small amounts, e.g., in amounts ranging from 0.0001 to 0.10 mole percent based on the amount of formaldehyde to be polymerized, and in some cases it is possible to use amounts of the metal salt less than 0.0001 mole percent. Preferably, an amount of 0.001 to 0.04 mole percent is used. In general, the use of amounts greater than 0.1 mole percent will bring no added advantages.

The inert liquid distributing agent or carrier used may be any distributing agent which is liquid, inert and does not react with the formaldehyde or the catalyst used but which is capable of dissolving the catalyst. Examples of suitable liquid carriers are ketones, e.g. acetone, methyl ethyl ketone and cyclohexanone (that is lower alkyl ketones of up to about 8 carbon atoms); and other lower alkyl compounds of similar carbon content, such as esters, e.g. ethyl acetate; ethers, e.g. diethyl ether, tetrahydrofuran, dioxan, and acetals; nitriles, e.g. acetonitrile; and hydrocarbons including substituted hydrocarbons, e.g. ethylene dichloride, nitromethane, carbon tetrachloride, and carbon sulphide. Nitrobenzene may also be used. In general, ethyl acetate, tetrahydrofuran, dioxan and acetone are the preferred distributing agents. Acetone, being cheap and easy to handle is specially preferred.

The catalytic metal salts of the present invention can be added as such to the distributing agent in which the polymerization is to take place. In most cases, however, it is preferred to add the metal salts in the form of a solution, preferably in a solution with the distributing agent to be used in polymerization.

The metal salts according to the invention can be used in combination with other known catalysts, e.g. tertiary amines, quaternary ammonium or phosphonium salts, and organic salts, such as cobalt octoate, tin oleate.

Other substances, e.g., chain transfer agents, antioxidants, stabilizers, fillers, pigments, etc., may be added during the polymerization.

The polymerization according to the invention is preferably carried out as a continuous process. It can, however, also be carried out as a batch process.

The temperature at which the process of the invention can be carried out may be varied within wide limits, e.g. between $-120$ and $+100°$ C. Preferably, the polymerization is carried out between $-40$ and $60°$ C. More preferably, the polymerization temperature is at about room temperature.

The pressure at which the polymerization can be carried out may also be varied within wide limits, e.g., between 0.1 an 10 atm. Still higher or lower pressures can be used but they are not preferred for economic reasons.

The formaldehyde used in the polymerization can be obtained in any known manner, e.g., by thermal decomposition of a hemiformal or decomposition of a formaldehyde polymer of low molecular weight, e.g. paraformaldehyde. The formaldehyde can also be obtained by decomposition of trioxan. If so desired, the formaldehyde can be first dissolved in a non aqueous solvent, for instance the liquid medium in which the polymerization is carried out, and the resulting solution fed into the polymerization zone.

The term "polyoxymethylenes" as used herein includes both the homopolymers and copolymers of formaldehyde. The copolymers preferably contain more than 90 mole percent of formaldehyde and comonomers such as isobutylene, dioxolone, vinyl ethers, vinyl-nitrogen compounds, cyclic ethers such as ethylene oxide, epichlorohydrin and dioxolan, and substituted or unsubstituted aldehydes and/or ketones.

The polymers obtained by the process of the invention may receive an end-group protective treatment and the various usual additives. Thereafter, the polymers can be shaped into fibers, films or other articles.

The invention will be further described with reference to the following examples.

Example 1

This example illustrates a typical prior art technique.

Formaldehyde was obtained by decomposition of 60 g. of paraformaldehyde (containing 96% by weight of formaldehyde) suspended in 200 ml. of dioxan and 1.25 ml. of 50% phosphoric acid. The formaldehyde was introduced, over a period of 1 hr., through a reflux cooler and two cooling vessels kept at $-15°$ C. into a stirred polymerization reactor containing 250 ml. of acetone in which has been dissolved 20 mg. of aluminium trichloride. After the introduction of the formaldehyde had been completed, the reaction was stopped, the yield of macromolecular polyoxymethylene was 70% of the theoretical yield. The resulting polymer had an inherent viscosity of 0.44, measured on a 0.5% solution of the polymer in parachlorophenol with 2% by weight of α-pinene at 60° C. As in the following examples, the temperature of the acetone distributing agent was at room temperature level or slightly higher.

The following examples illustrate the present inventive process.

Example 2

Example 1 was repeated except that the aluminium chloride was replaced by 20 mg. of zinc nitrate containing 4 molecules of water of crystallization per molecule of zinc nitrate. The same amount of polyoxymethylene was obtained. The inherent viscosity of this product was 2.3 measured as in Example 1.

Example 3

Example 2 was repeated, the catalyst in this case was 20 mg. of cadmium nitrate dissolved in 250 ml. of acetone. The yield of polymer was 85% of the theoretical yield. The polyoxymethylene had an inherent viscosity of 2.4, which was measured on a solution in dimethyl formamide because (probably due to the strongly crystalline character of the polymer) parachlorophenol was incapable of dissolving the polymer. The viscosity found by means of dimethyl formamide was reduced to the viscosity which the polymer would have shown in parachlorophenol.

Example 4

Example 3 was repeated, but the solvent used was 250 ml. of ethyl acetate. The inherent viscosity was found to be 3.2.

Example 5

Under the same conditions as in the preceding examples, formaldehyde was passed into a solution of 30 mg. of cobalt nitrate, containing 6 molecules of water of crystallization of per molecule of cobalt nitrate in 250 ml. of ethyl acetate. The yield obtained was 90%. The polyoxymethylene so obtained has an inherent viscosity of 3.1.

Example 6

Example 2 was repeated. The reaction medium was 250 ml. of tetrahydrofuran and 40 mg. of ferric nitrate with 9 molecules of water of crystallization per molecule of ferric nitrate. The yield of polyoxymethylene amounted to 65% of the theoretical yield. The polymer had a viscosity of 2.7.

What is claimed is:

1. The process for preparing macromolecular polyoxymethylenes comprising:
    dissolving a catalyst comprising a carbon-free and halogen-free metal salt of an inorganic acid, present in a required amount in the range of between about 0.001 to 0.10 mol percent in an inert liquid carrier, said metal being an element whose halide is a Friedel-Crafts catalyst, excluding mercury; and
    thereafter passing formaldehyde into said inert liquid carrier to produce the polyoxymethylene product.

2. The process according to claim 1 wherein said metal is selected from the group consisting of boron, cadmium, cobalt, aluminium, tin, antimony, titanium, zinc and iron.

3. The process according to claim 1 wherein said inorganic acid is nitric acid.

4. The process according to claim 3 wherein said catalyst is iron nitrate.

5. The process according to claim 3 wherein said catalyst is cobalt nitrate.

6. The process according to claim 3 wherein said catalyst is zinc nitrate.

7. The process according to claim 3 wherein said catalyst is cadmium nitrate.

8. The process according to claim 1 wherein said inert liquid carrier is selected from the group consisting of lower alkyl ketones containing up to about 8 carbon atoms, lower alkyl esters containing up to about 8 carbon atoms, lower alkyl ethers containing up to about 8 carbon atoms, lower alkyl nitriles containing up to about 8 carbon atoms, lower alkyl hydrocarbons containing up to about 8 carbon atoms and nitrobenzene.

9. The process according to claim 8 wherein said inert liquid carrier is acetone.

10. The process according to claim 8 wherein said inert liquid carrier is tetrahydrofuran.

11. The process according to claim 8 wherein said inert liquid carrier is ethyl acetate.

12. The process according to claim 1 wherein said polymerization is carried out at a temperature between about −40 to 60° C.

References Cited

UNITED STATES PATENTS 2,768,994 10/1956 MacDonald.
3,194,789 7/1965 Oba et al.
3,225,006 12/1965 Takahashi et al.

WILLIAM H. SHORT, *Primary Examiner.*

L. M. PHYNES, *Assistant Examiner.*

U.S. Cl. X.R.

260—64, 73